April 12, 1938.    R. H. CALDWELL ET AL    2,113,825
METHOD AND APPARATUS FOR TESTING WATCHES
Filed April 18, 1936    2 Sheets-Sheet 1
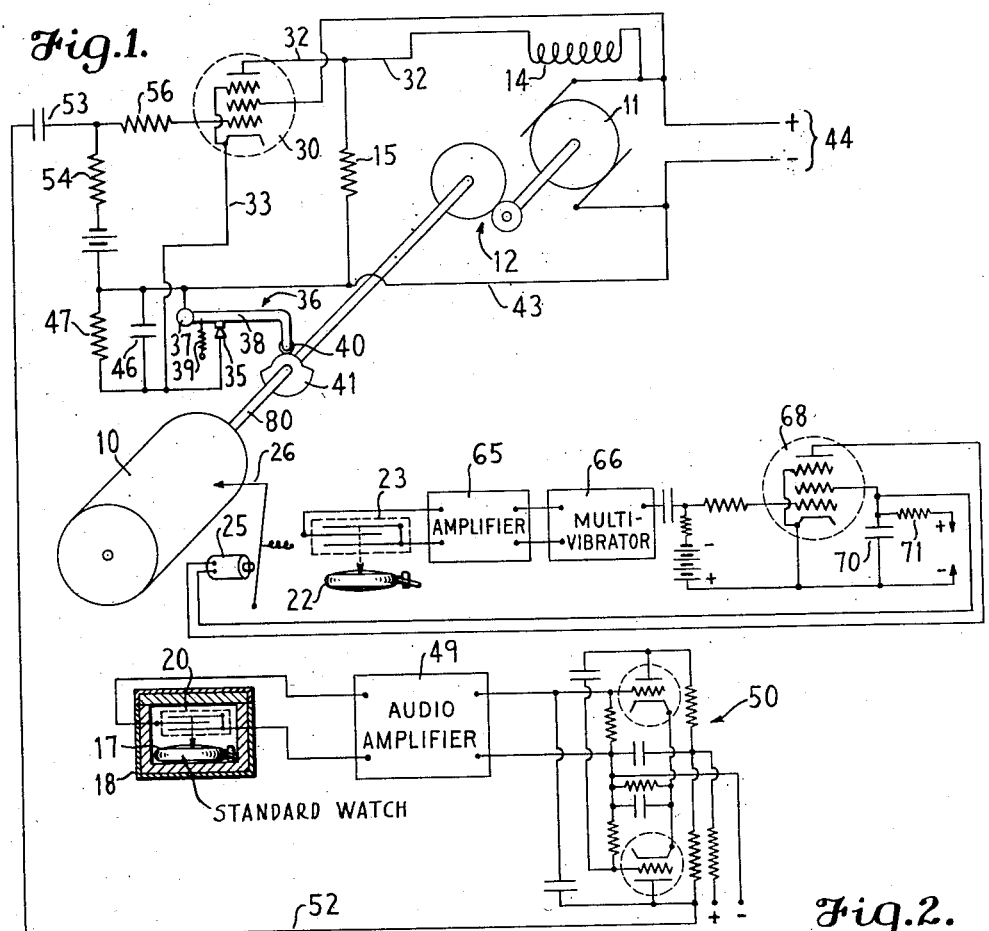
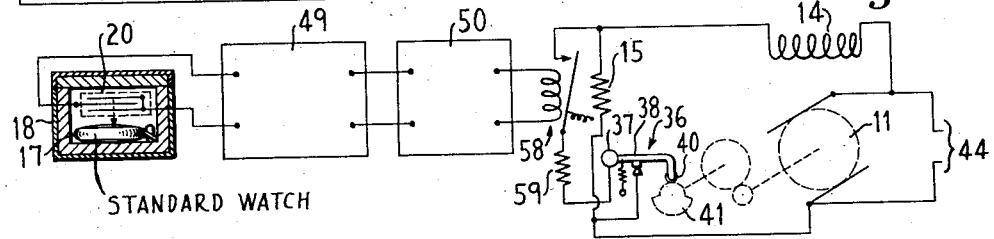
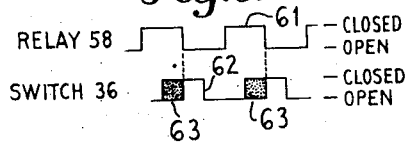 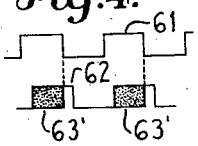
INVENTORS
Rufus H. Caldwell and
Verne T. Braman
BY
J. F. Vandenberg    ATTORNEY April 12, 1938.  R. H. CALDWELL ET AL  2,113,825
METHOD AND APPARATUS FOR TESTING WATCHES
Filed April 18, 1936  2 Sheets-Sheet 2

Patented Apr. 12, 1938

2,113,825

UNITED STATES PATENT OFFICE 2,113,825

METHOD AND APPARATUS FOR TESTING WATCHES

Rufus H. Caldwell, Jackson Heights, Long Island, and Verne T. Braman, New York, N. Y., assignors to Bulova Watch Company, Inc., New York, N. Y., a corporation of New York Application April 18, 1936, Serial No. 75,244

8 Claims. (Cl. 181—0.5)

This invention relates to method and apparatus for the testing of watches.

When watches are regulated without apparatus for testing their rate, it is necessary to let a watch run for many hours after each shifting of the regulator in order to determine whether any further regulation is necessary, and if so, in what direction. Regulation is a matter of days and the amount of time consumed in regulating watches adds considerable cost to the operation of watch factories and repair departments. It is a serious inconvenience to a watch-owner to be deprived of his timepiece for a number of days while it is regulated after being cleaned or repaired.

Apparatus for testing the rate of watches quickly has been proposed, but so far as we are aware all such apparatus which has proved itself practical has been complicated and of such high cost that many watch-repair establishments have not been able to afford the required capital investment.

It is an object of this invention to provide an improved method of testing watches by comparing them with a standard watch or watch movement which is highly accurate or the error of which is known.

Another object is to provide improved means for quickly determining the rate of a watch. The invention comprises novel features and combinations of elements that make the apparatus economical to manufacture and convenient and advantageous in use.

Other objects, features and advantages of the invention will appear or be pointed out as the specification proceeds.

In the accompanying drawings, forming part hereof:

Fig. 1 is a diagrammatic, exploded view showing the apparatus of the preferred embodiment of the invention, and including the electric circuits;

Fig. 2 is a diagrammatic view of a portion of the apparatus shown in Fig. 1 but illustrating a modified form of the invention;

Figs. 3–5 are charts illustrating the operation of the motor speed controls of Figs. 1 and 2;

Figure 6:
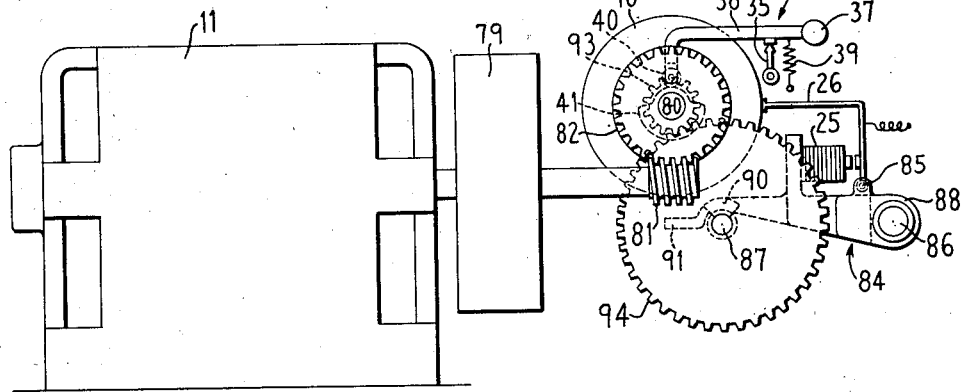
Fig. 6 is an end view of the apparatus for recording the rate of the watch.

A platen or drum 10 is driven by a motor 11 through reduction gearing 12. The motor has a shunt field coil 14 in series with a resistor 15 which limits the field current to such a value that the motor runs faster than the desired speed.

A control circuit in parallel with the resistor 15 is intermittently effective to carry a marginal current which increases the strength of the motor field and causes the motor to run slower. The length of time that the control circuit is effective to carry current is determined by a standard watch 17, or watch movement, enclosed in a sound-proof box 18.

The mechanical vibrations of the watch 17, caused by the beat or "ticking" of the escapement, are converted into electrical impulses by means of a contact microphone 20 or other suitable apparatus in the box 18. A microphone of the piezoelectric crystal type may be used, but the invention is not limited to any particular apparatus for converting the mechanical vibrations of the watch into electrical impulses.

The manner in which the speed of the motor 11 is controlled by the frequency of the electrical impulses from the microphone 20 will be explained hereinafter, but for an understanding of the method of testing watches in accordance with this invention it is sufficient to know that the control circuit keeps the motor 11 running at a definite speed proportional to the frequency of the ticks of the watch. The drum 10 is preferably rotated at a speed of one revolution for each watch tick, or at some multiple of that speed.

An unknown watch 22 which is to be tested is placed under a microphone 23, and the ticks of the watch 22 cause electrical impulses in the microphone circuit. These impulses are used in electric circuits to periodically energize a magnet 25 that causes a stylus 26 to peck against the drum 10 once for each tick of the watch 22.

Relative movement of the drum and stylus in a direction parallel to the drum axis is effected by mechanism which will be explained in describing Figs. 6 and 7.

When the watches 17 and 22 are ticking at the same rate, the stylus 26 strikes the drum 10 once in each revolution of the drum and when the drum is in exactly the same angular position. The relative axial movement of the drum and stylus in such a case causes the stylus to make a row of dots on the drum which lies along a straight line normal to a right section through the drum. The stylus marks a strip of paper on the surface of the drum and the paper is removed from the drum as a record of performance for the particular watch tested.

If the unknown watch 22 runs faster than the standard watch 17, then the stylus 26 strikes the drum before it has completed a full revolution since the last peck of the stylus. The line of dots made by the stylus in such a case extends along the drum as a spiral, the pitch of the spiral being less with greater differences in the rates of operation of the watches. If the unknown watch runs slower than the standard watch, the dots lie along a spiral, but if the direction of drum rotation is such that the fast watch produces a right-hand spiral, then the slow watch produces a left-hand spiral.

When the paper is removed from the drum and laid flat, the line of dots which formed a spiral on the drum becomes a straight line, sloping up or down toward the right depending upon whether the watch tested was fast or slow. By using specially ruled graph paper on the drum it is possible to tell from the number of spaces crossed by the line of dots exactly how fast or slow the tested watch is running in comparison with the standard watch. The algebraic sum of this difference and the known error, if any, of the standard watch is the actual deviation of the tested watch from correct time. The accuracy of the results obtained when testing watches in accordance with the method of this invention does not depend, therefore, on the rate of the watch or watch movement used as a standard for comparison, because allowance is made for known error in the standard timepiece, as explained above.

The speed of the motor 11 is controlled by the standard watch 17 through a control tube 30. This control tube provides a circuit in parallel with the resistor 15, and when current is flowing through both the tube 30 and resistor 15 the current through the motor field coil 14 tends to reduce the motor speed below the desired value. When no current flows through the tube 30, the resistor 15 limits the field current of the motor to a value which tends to make the motor run faster than the desired speed.

The control tube 30 is preferably a vacuum tube of the pentode type. We have found a pentode tube most satisfactory because of its effective shunting ability over a wide range of anode potentials. The field coil 14 is connected with the anode of the tube 30 by a conductor 32. The cathode of the tube is connected, by a conductor 33, with a contact 35 of a switch 36. Although the switch 36 can be on the other side of the tube 30, we have found that the tube operates with much greater stability when the switch 36 is in the cathode circuit.

The switch 36 has an arm 38 supported by a pivot 37. A spring 39 urges the arm 38 against the contact 35 to close the switch. A cam-follower 40 at one end of the arm 38 is lifted by a cam 41, on the same shaft with the drum 10, to open the switch 36. The cam 41 holds the switch open during approximately one half of each revolution of the drum.

The arm 38 or the portion of it which comprises the movable contact of the switch 36 is connected with a conductor 43 leading to the power line 44. We have found it desirable to connect a capacitor 46 and a resistor 47 in parallel across the switch 36.

Electrical impulses from the microphone 20 are amplified in an audio-amplifier 49. Since these impulses are in a wide variety of wave forms because of the various characteristics of different chronometers, and for other reasons, it is desirable to convert these impulses into a periodic wave form of known and controllable characteristics. In order to obtain such a wave form we employ a multi-vibrator 50 or relaxation oscillator, which is "triggered" by the impulses from the amplifier 49. The output of the multi-vibrator has the same frequency as the escapement of the watch 17, and the wave form is more or less rectangular.

The multi-vibrator 50 is coupled to the control grid of the tube 30 by means of a conductor 52, capacitor 53, and resistor 54. A resistor 56 is connected in series with the grid to suppress grid current, which might affect the stability of the multi-vibrator.

Fig. 2 shows a modified form of apparatus for controlling the motor speed. A relay 58 is employed in place of the control tube 30 of Fig. 1. The switch of the relay 58 is connected in series with the cam-operated switch 36 and with a resistor 59. This series circuit is connected in parallel with the resistor 15 and controls the marginal current which regulates the motor speed. The relay 58 is operated by power impulses from the multi-vibrator 50 to open and close once for every tick of the standard watch or chronometer 17.

Figs. 3–5 show the operation of the motor speed control apparatus. The curve 61 illustrates the opening and closing of the relay 58 in response to power impulses from the multi-vibrator 50; or with the circuit of Fig. 1 the curve 61 represents the periods when the tube 30 opens and closes the circuit between the conductors 32 and 33. The curve 62 illustrates the opening and closing of the cam-operated switch 36.

Since the switch 36 is in series with the relay 58, or tube 30, it is evident that the current will pass through this series circuit only when both the switch and the relay, or tube, are effective to close the circuit. This time is represented in Fig. 3 by the width of shaded areas 63. It will be noted that current flows in the relay (or tube) circuit during one-quarter of each cycle in Fig. 3, this being the condition when the motor 11 is running at the desired speed and turning the drum 10 one revolution for each tick of the watch 17.

If the motor 11 runs faster than the correct speed, the switch 36 opens sooner, as shown in Fig. 4, and the shaded areas 63' are wider than the areas 63 of Fig. 3. This means that current flows in the relay (or tube) circuit for a longer period during each cycle, with the result that the average field current is greater and the motor 11 tends to slow down.

A drop in motor speed below the correct value causes a phase shift between the curves 61 and 62 which makes the time of current-flow shorter, as indicated by the width of the shaded areas 63" in Fig. 5. This condition decreases the average value of the current flowing in the field coil of the motor and tends to increase the motor speed.

It will be evident that the motor speed can be controlled in accordance with the method above described but with opposite changes in the current. In the apparatus described, the closing of a circuit to effect a flow of current is utilized to slow down the motor, but if the circuit closed is in series with a separate field winding which opposes the polarity of the motor field, the flow of current in the control circuit would speed up the motor.

The stylus 26 is operated by electrical impulses received from the microphone 23. These impulses are amplified in an audio-amplifier 65 and utilized to operate a multi-vibrator 66. The output of the amplifier 65 will have various wave forms, depending upon the characteristics of the ticks of the watches tested. The purpose of the multi-vibrator 66 is to change these varied waves from different watches into waves of known form.

The impulses from the multi-vibrator 66 control a tube 68, the output of which energizes the stylus-operating magnet 25. A feature which has been very advantageous is the charge and discharge circuit in the anode and screen of the tube 68. Upon the initial surge of the control grid of the tube 68, the anode draws a strong current which energizes the magnet 25 and actuates the stylus. Almost instantly, however, a condenser 70, which supplies the anode potential, is discharged and the stylus drops back. The condenser 70 is recharged by the resistor 71 on the reverse half of the multi-vibrator cycle. This quick action gives a very sharp and definite mark of the stylus on the drum.

The drum 10 has collars 74 (Fig. 7) at its ends and the surface of the drum between these collars is covered with paper 75. The stylus 26 marks the paper, which is then removed from the drum and a new sheet or lower layer used for the record of the next watch. By using specially ruled coordinate paper on the drum it is possible to tell from the number of angular spaces that the stylus markings advance in crossing between the circumferential lines of the graph exactly how much difference there is in the rate of the stylus-actuating watch and that of the standard watch which controls the drum speed.

Figure 7:
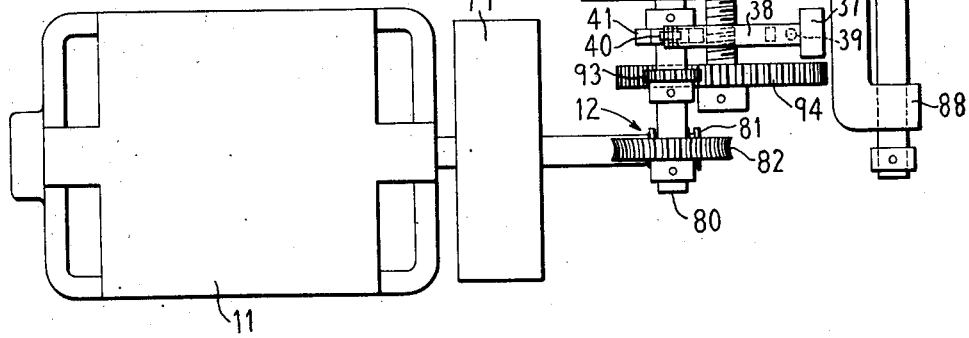
Fig. 7 is a plan view of the apparatus shown in Fig. 6.

The coordinate ruling of the paper 75 is indicated by the reference character 77 in Fig. 7. Since the width of the graph on the paper 75 must represent the passage of a definite length of time, the speed at which the stylus moves parallel to the axis of the drum 10 must be accurately controlled. In the illustrated embodiment of the invention the stylus 26 is moved lengthwise of the drum 10 by mechanism driven from the motor 11 and shown in Figs. 6 and 7.

The motor 11 has a flywheel 79 to smooth out the speed pulsations caused by the surges in the field current. The drum 10 is secured to a shaft 80, and the reduction gearing 12 through which the motor drives the drum includes a worm 81 on the motor shaft and a worm-wheel 82 on the drum shaft 80.

A carriage 84 supports the stylus 26 and the electromagnet 25 which operates the stylus. A pivot 85 connects the stylus to the carriage. The carriage is supported by a guide rod 86 and a lead screw 87, both of which extend parallel to the axis of rotation of the drum 10. The carriage has two bearings 88, surrounding the guide rod 86 and widely spaced so that the carriage is freely slidable lengthwise along the guide rod.

The carriage 84 has a bearing 90 contacting with the top of the lead screw 87 for only a short arc and grooved to fit the threads of the screw. This bearing construction permits the carriage to be lifted out of contact with the lead screw when the carriage is to be returned to its starting position. A handle 91 extending from one side of the carriage provides a convenient grip for lifting the carriage out of contact with the lead screw. A block can be placed under the handle 91 to hold it up when the lead screw is rotating, but the attendant is not yet ready to start the recording mechanism.

The lead screw 87 is driven from the drum shaft 80 by a pinion 93 secured to the drum shaft and meshing with a large gear 94 connected to the lead screw. The relative sizes of the gears 93 and 94, the pitch of the lead screw 87, and the mechanical advantage of the reduction gearing 12 are proportioned according to the speed of the motor and the scale of graph which it is desired to record on the drum 10.

It will be apparent that this invention is not limited to the particular embodiments which have been illustrated and described, and that features of the invention may be used without others.

We claim:

1. The method of recording the rate of a watch which comprises controlling the rate of rotation of a drum with impulses produced by the beat of a standard watch, operating a stylus to mark the drum with a frequency determined by the rate of the watch to be tested, and causing relative movement of the stylus and drum parallel to the axis of rotation of the drum in addition to the operation of the stylus to mark the drum.

2. The method of recording the rate of a watch which comprises controlling the rate of rotation of a drum with impulses produced by the beat of a standard watch, causing a stylus to peck against the drum with a frequency controlled by the beat of the watch to be tested, and at the same time causing relative movement of the stylus and drum in a direction lengthwise of the drum.

3. In a watch testing device, means for transforming the mechanical vibrations of the escapements of a standard watch and a watch to be tested into two series of electrical impulses having frequencies corresponding to the beats of the respective watches, and recording apparatus controlled by both of said series of impulses, said recording apparatus including a moving surface the speed of which is controlled by one of said series of electrical impulses, and a marker that moves against said surface and has its operation controlled by the other of said series of impulses to make a record of the operation of the watch being tested relative to the operation of said standard watch.

4. Watch testing apparatus comprising a platen, means for moving the platen including a motor, a device for converting the mechanical vibrations of the escapement of a standard watch into electrical impulses, and control means which cause the motor to run at a speed proportional to said impulses, a stylus for marking the platen, and stylus-operating means responsive to the beating of a watch to be tested.

5. Apparatus for recording the rate of a watch including in combination a drum, a motor for rotating the drum, a speed control which causes the motor to operate at a speed proportional to the rate of a standard watch, said speed control comprising apparatus responsive to electrical impulses, and means for converting the mechanical vibrations of the escapement of the standard watch into electrical impulses, a stylus for marking the cylindrical surface of the drum, means controlled by the beating of the watch to be tested for moving the stylus into and out of contact with the drum, and mechanism for causing uniform relative movement of the stylus and drum in a direction parallel to the axis of rotation of the drum.

6. Apparatus for recording the difference between the rate of a standard watch and that of another watch, said apparatus including two microphones, one for each watch, recording apparatus including a platen and a stylus, separate operating means for moving the platen and stylus, and means responsive to the electrical impulses from the respective microphones for controlling the separate operating means of the platen and stylus.

7. A watch testing device comprising a drum, an electric motor for rotating the drum, a microphone for converting the beats of a standard watch into electrical impulses, motor speed control means responsive to said impulses and adapted to cause the motor to run at a speed proportional to the frequency of the electrical impulses from said microphone, a stylus for marking a record on the drum, means including an electromagnet for moving the stylus into or out of contact with the drum, a microphone for converting the beats of a watch being tested into electrical impulses for controlling the operation of said electromagnet, a carriage supporting the stylus and electromagnet, a guide on which the carriage moves parallel to the axis of rotation of the drum, a lead screw for advancing the carriage, and reduction gearing through which the lead screw is driven from the electric motor.

8. A watch testing device including in combination a drum, mechanism for rotating the drum, a microphone for converting the beats of a standard watch into electrical impulses and adapted to cause the drum to rotate at a sped proportional to the frequency of the electrical impulses from said microphone, a stylus, means including an electric circuit for causing the stylus to move toward or from the drum, another microphone for converting the beats of a watch being tested into electrical impulses in the circuit of the stylus-operating means, a carriage supporting the stylus and at least a part of its operating means, a lead screw for advancing the carriage in a direction parallel to the axis of rotation of the drum, and motion-transmitting connections for driving the lead screw from the mechanism that rotates the drum.

RUFUS H. CALDWELL.
VERNE T. BRAMAN.